United States Patent
Hensley

(10) Patent No.: US 10,343,764 B2
(45) Date of Patent: Jul. 9, 2019

(54) AIRCRAFT WHEEL FAIRING DRAG DEVICE

(71) Applicant: Robert A. Hensley, Clearwater, FL (US)

(72) Inventor: Robert A. Hensley, Clearwater, FL (US)

(*) Notice: Subject to any disclaimer, the term of this patent is extended or adjusted under 35 U.S.C. 154(b) by 362 days.

(21) Appl. No.: 15/223,506

(22) Filed: Jul. 29, 2016

(65) Prior Publication Data

US 2017/0113782 A1    Apr. 27, 2017

Related U.S. Application Data

(60) Provisional application No. 62/244,329, filed on Oct. 21, 2015.

(51) Int. Cl.
*B64C 9/32* (2006.01)
*B64C 25/00* (2006.01)
*B64C 25/06* (2006.01)

(52) U.S. Cl.
CPC .............. *B64C 9/32* (2013.01); *B64C 25/001* (2013.01); *B64C 25/06* (2013.01)

(58) Field of Classification Search
CPC .... B64C 9/32; B64C 9/34; B64C 9/36; B64C 25/001; B64C 25/06
See application file for complete search history.

(56) References Cited

U.S. PATENT DOCUMENTS

| | | | | |
|---|---|---|---|---|
| 2,461,967 A * | 2/1949 | Devlin | ................. | B64D 27/023 244/113 |
| 2,538,878 A * | 1/1951 | Misulis | ................... | B64C 25/16 244/102 R |
| 2,698,149 A * | 12/1954 | Greenwood | ......... | B64D 27/023 244/113 |
| 2,996,047 A * | 8/1961 | Denniston | ............ | B63B 19/197 49/340 |
| 3,848,831 A * | 11/1974 | Geary | ...................... | B64C 9/36 244/110 D |
| 4,165,849 A * | 8/1979 | Fox | .......................... | B64C 9/32 244/113 |
| 8,231,077 B2 * | 7/2012 | Botich | .................... | B64C 27/82 244/17.13 |

FOREIGN PATENT DOCUMENTS

GB            001310463 A *   6/1971   ............... B64C 9/32

* cited by examiner

*Primary Examiner* — Nicholas McFall

(57) ABSTRACT

An aircraft wheel fairing drag device, which increases the functionality and operating capabilities of an aircraft wheel fairing for a fixed landing gear aircraft, has a linear actuator, a drag door, and a mounting plate. The mounting plate is positioned within the aircraft wheel fairing and supports the linear actuator. Meanwhile, the linear actuator is operably coupled to the drag door, wherein a driver linearly positions a push rod that is pivotally engaged with a rod mount of the drag door. The rod mount and a fairing hinge are connected to a drag pane, wherein the rod mount is operably disposed from the fairing hinge to allow the drag pane to be angularly positioned relative to the aircraft wheel fairing as the push rod is linearly extended. The fairing hinge provides a rotational axis between the aircraft wheel fairing and the drag pane about which the drag pane is rotated.

3 Claims, 6 Drawing Sheets

AIRCRAFT WHEEL FAIRING DRAG DEVICE

The current application claims a priority to the U.S. Provisional Patent application Ser. No. 62/244,329 filed on Oct. 21, 2015.

FIELD OF THE INVENTION

The present invention relates generally to aircraft drag devices. More specifically, the present invention is a wheel fairing drag device that increases the functionality and operating capabilities of aircraft landing gear.

BACKGROUND OF THE INVENTION

Two types of landing gear exist for aircraft: fixed landing gear and retractable landing gear. There are benefits and drawbacks to each type of landing gear, wherein the type of landing gear used with each aircraft depends on the design and constraints of the aircraft. Retractable landing gear reduce the drag of the aircraft in flight by allowing the wheels to be tucked away into the fuselage, providing a more aerodynamic profile for the aircraft. However, retractable landing gear systems add more weight to the aircraft and are more complex in design, which provides more opportunity for component failure and requires more maintenance. Fixed landing gear, on the other hand, are lighter in weight and simpler in design, but produce increased drag as the landing gear remains extended away from the fuselage. To combat the increased drag, wheel fairings are often provided for fixed landing gear systems. Each wheel fairing partially surrounds a wheel and provides an aerodynamic surface to reduce drag. The single functionality of such wheel fairings is to reduce the drag.

Therefore it is an object of the present invention to provide an aircraft wheel fairing drag device that increases the functionality of an aircraft wheel fairing and also increases the operating capabilities of an aircraft. A drag pane is crafted having an aerodynamically contoured exterior that corresponds to an aerodynamic profile of the aircraft wheel fairing. The drag pane is operable between a retracted position and a plurality of extended positions via a linear actuator that is mounted within the aircraft wheel fairing by a mounting plate. The linear actuator has a driver and a shaft, wherein the driver linearly extends the shaft, which in turn pivots the drag pane about a rotational axis of a fairing hinge that pivotally connects the drag pane to the aircraft wheel fairing. When in the retracted position, the aerodynamically contoured exterior matches the aerodynamic profile of the aircraft wheel fairing to reduce the drag of the landing gear. Meanwhile, in each of the plurality of extended positions, the drag pane is pivoted away from the aircraft wheel fairing in order to induce a certain amount of drag. The ability to induce drag can be utilized to simulate retractable landing gear for training purposes, increase the rate of descent, land of runways of limited length, etc.

DETAIL DESCRIPTIONS OF THE INVENTION

All illustrations of the drawings are for the purpose of describing selected versions of the present invention and are not intended to limit the scope of the present invention.

Figure 1:
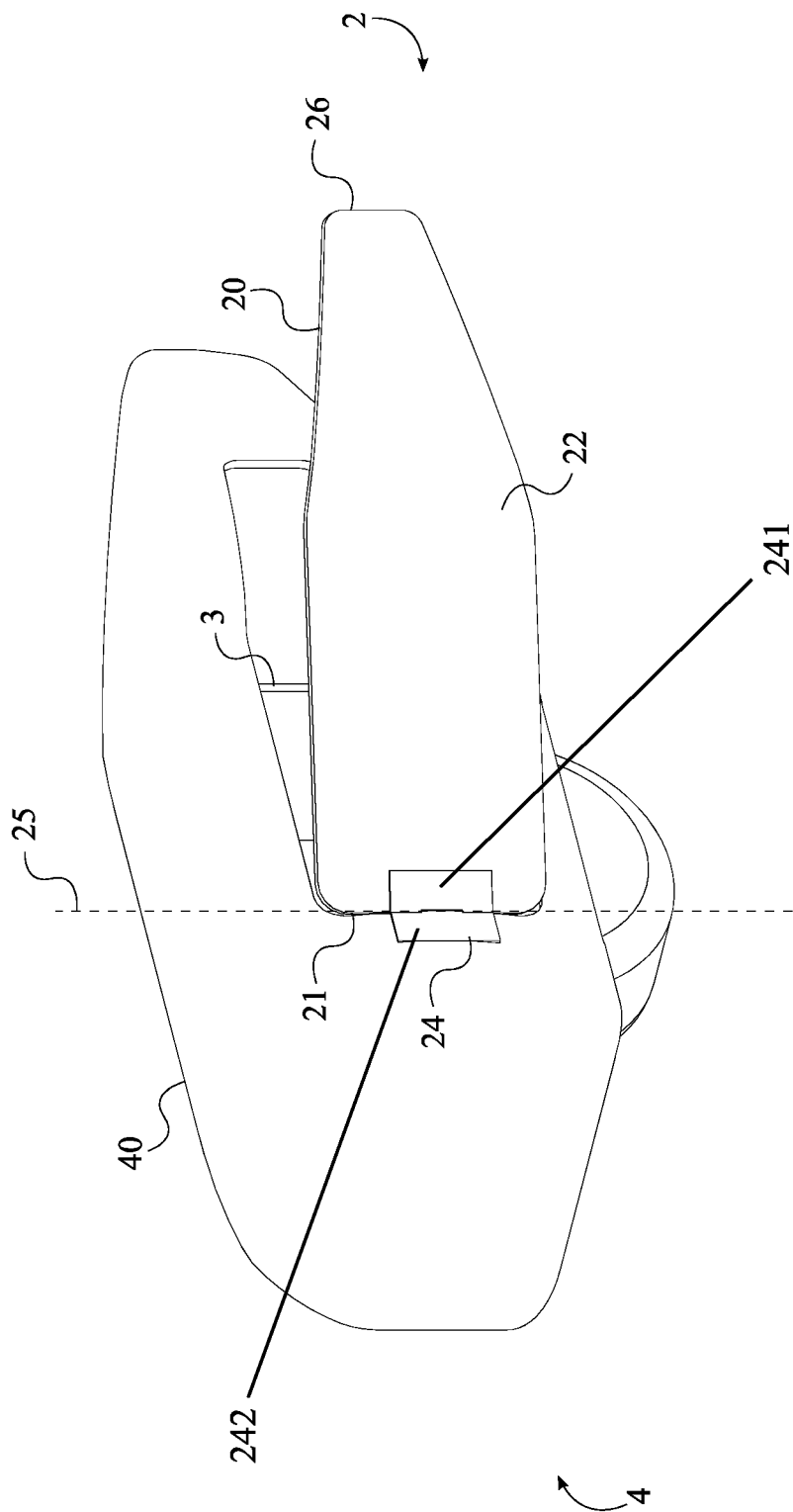
FIG. 1 is a front perspective view of the present invention integrated into an aircraft wheel fairing, wherein the drag pane is positioned in one of the plurality of extended positions.

The present invention is an aircraft wheel fairing drag device that increases the functionality and operating capabilities of the wheel fairing of fixed landing gear aircraft. The present invention provides a controlled increase in drag that can be applied for training purposes, simulating retractable landing gear, or performing inflight maneuvers such as increasing the rate of decent or landing on runways of limited length. To provide such capabilities, the present invention comprises a linear actuator 1, a drag door 2, and a mounting plate 3 as depicted in FIG. 1-2.

The linear actuator 1 is coupled to the drag door 2, wherein the linear actuator 1 positions the drag door 2 in relation to an aircraft wheel fairing 4. In reference to FIG. 2, the linear actuator 1 comprises a driver 10 and a push rod 11; the push rod 11 being operatively coupled to the driver 10. The push rod 11 provides the linear motion that is utilized to extend and retract the drag door 2, while the driver 10 provides the means for actuating the push rod 11. Meanwhile, the mounting plate 3 provides a means for supporting the linear actuator 1 and connecting the linear actuator 1 to the landing gear assembly within the aircraft wheel fairing 4.

Figure 2:
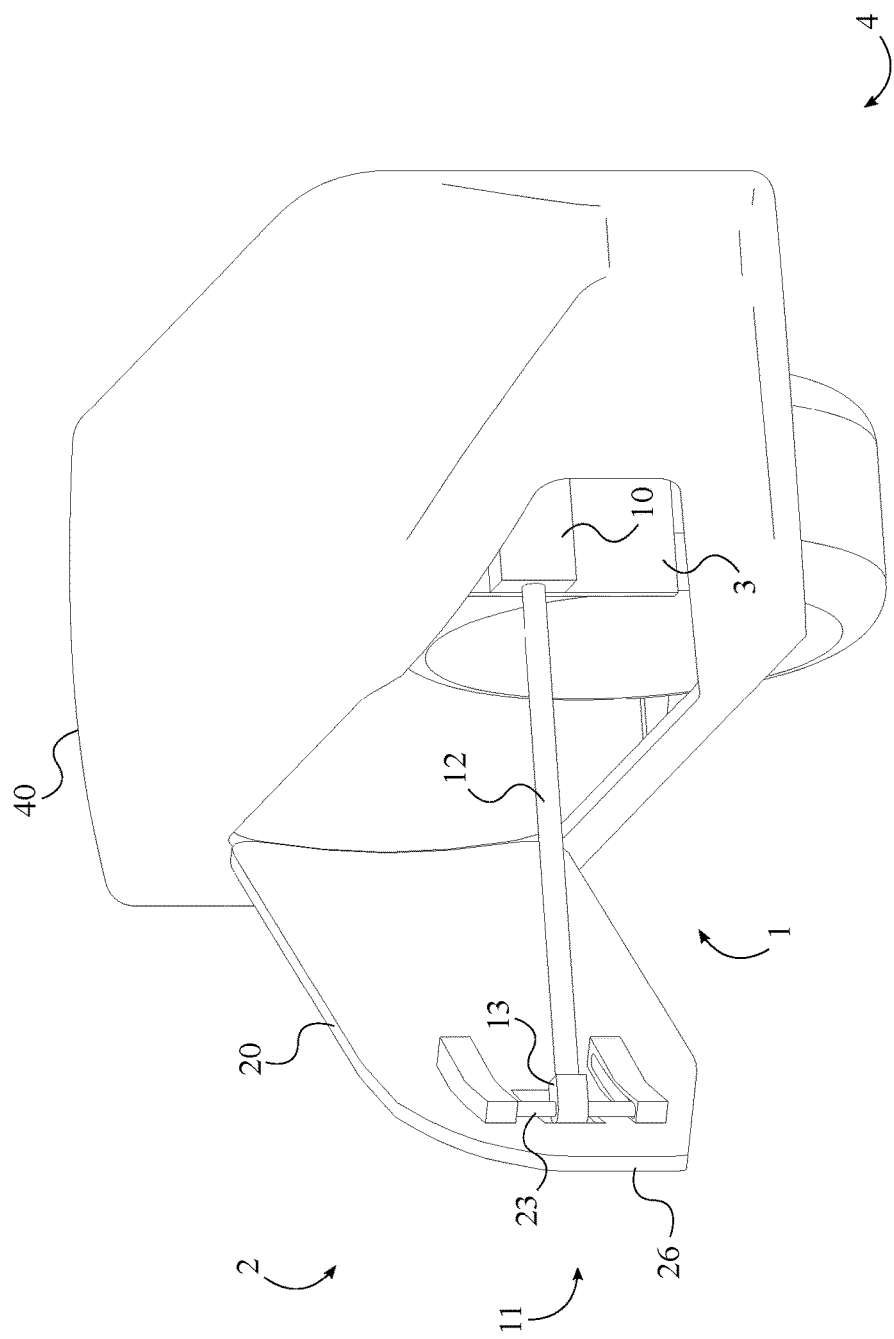
FIG. 2 is a rear perspective view of the present invention integrated into the aircraft wheel fairing, wherein the mounting plate and the driver are positioned within the aircraft wheel fairing.
Figure 3:
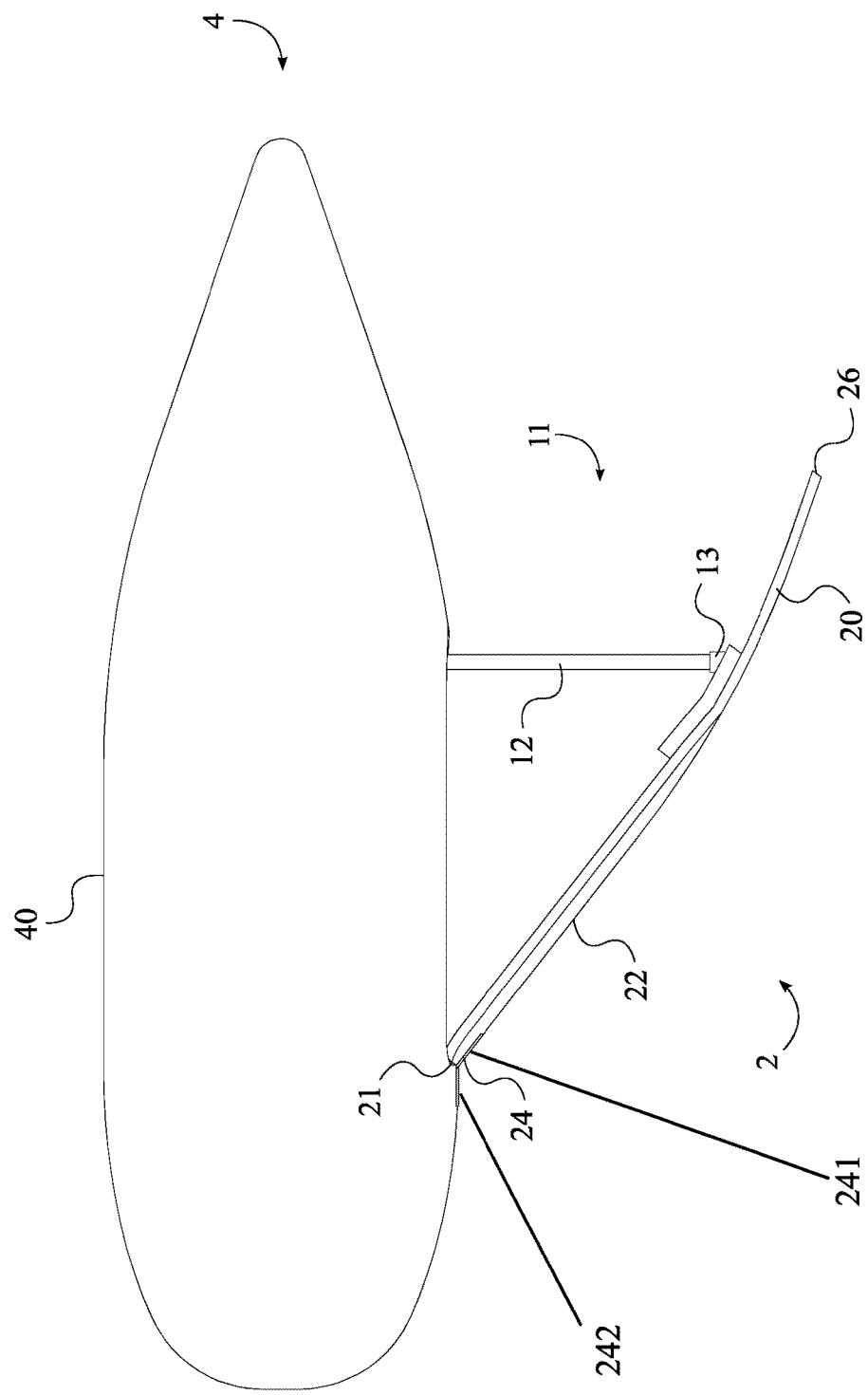
FIG. 3 is a top plan view depicting the drag pane being configured in one of the plurality of extended positions.

In reference to FIG. 2-3, the push rod 11 operatively connects the driver 10 to the drag door 2, wherein the push rod 11 comprises a shaft 12 and a head 13. The shaft 12 is slidably engaged with the driver 10 such that the driver 10 extends the shaft 12 away from the driver 10 and retracts the shaft 12 into the driver 10. The head 13 is terminally connected to the shaft 12 opposite the driver 10 and provides a pivoting point of connection with the drag door 2. As such, the driver 10 determines the distance at which the head 13 is positioned relative to the driver 10 by extending or retracting the shaft 12.

The drag door 2 is a flap that is extended from the aircraft wheel fairing 4 via the linear actuator 1 in order to increase the drag of the aircraft. The drag door 2 can be positioned at a number of different angles in relation to the aircraft wheel fairing 4 in order to provide different amounts of drag. In reference to FIG. 2, the drag door 2 comprises a drag pane 20 that provides the drag generating surface, and a rod mount 23 and a fairing hinge 24 that provide the pivotal connections needed to angularly extend the drag pane 20 relative to the aircraft wheel fairing 4. As such, both the rod mount 23 and the fairing hinge 24 are adjacently connected to the drag pane 20.

The drag pane 20 is operable between a retracted position and a plurality of extended positions. In the retracted position, the drag pane 20 rests flush with the exterior of the aircraft wheel fairing 4. Meanwhile, each of the plurality of extended positions provides a different angle of orientation between the aircraft wheel fairing 4 and the drag pane 20, wherein one end of the drag pane 20 is extended away from the aircraft wheel fairing 4 as depicted in FIG. 1-2. The degree to which the drag pane 20 is angled in relation to the aircraft wheel fairing 4 determines the drag force that is generated, such that each of the plurality of extended positions is associated with a different drag force.

The drag pane 20 comprises a leading edge 21 and a trailing edge 26 that are terminally positioned opposite each other along the length of the drag pane 20. In reference to FIG. 5, when the drag pane 20 is in the retracted position, the leading edge 21 is positioned nearest the fore of the aircraft wheel fairing 4, while the trailing edge 26 is positioned nearest the aft of the aircraft wheel fairing 4. In the preferred embodiment of the present invention, the trailing edge 26 is positioned away from the aircraft wheel fairing 4 when the drag pane 20 is configured in one of the plurality of extended positions. However, in other embodiments, it is possible for the leading edge 21 to be positioned away from the aircraft wheel fairing 4.

Figure 4:
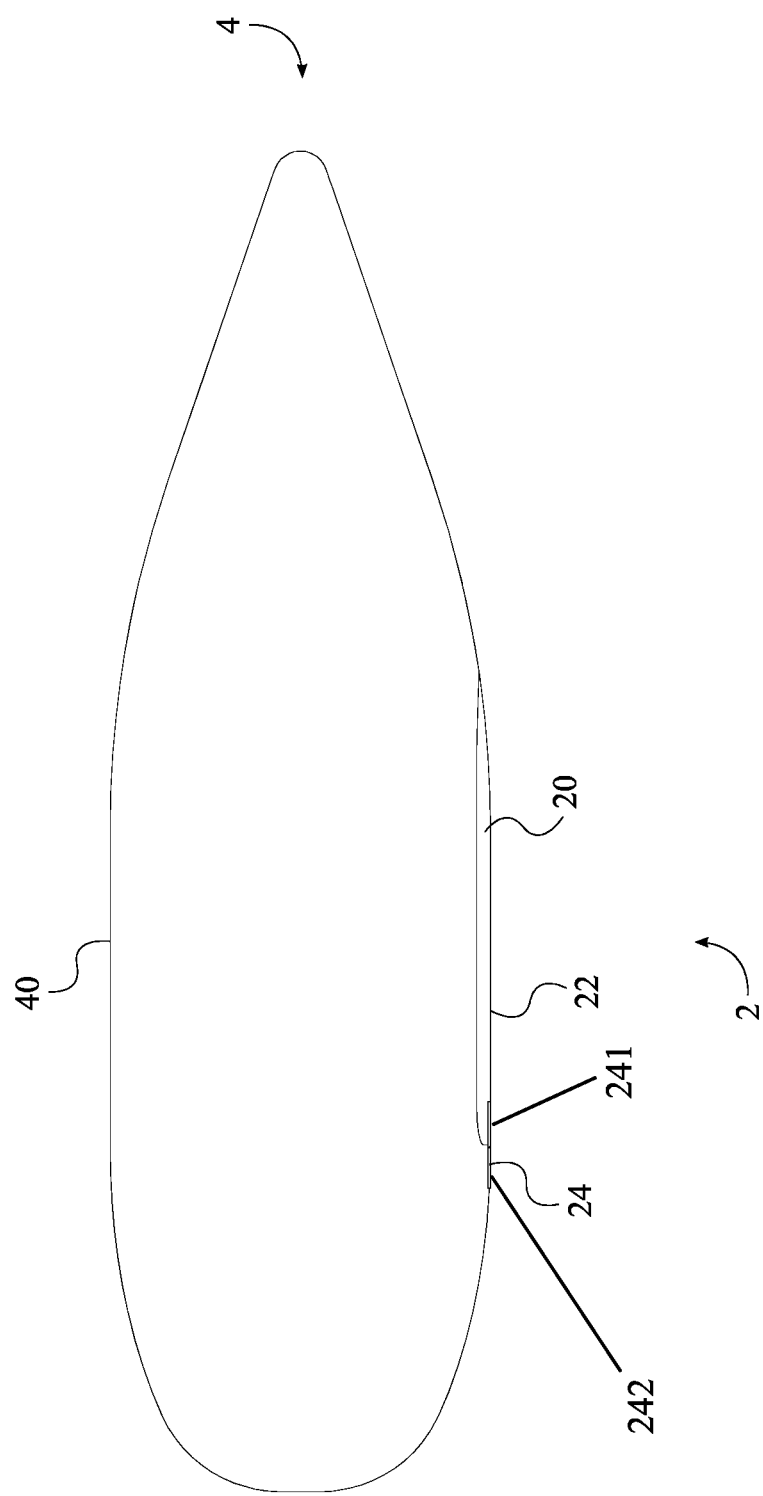
FIG. 4 is a top plan view depicting the drag pane being configured in a retracted position, wherein the aerodynamically contoured exterior corresponds to the aerodynamic profile of the aircraft wheel fairing.
Figure 5:
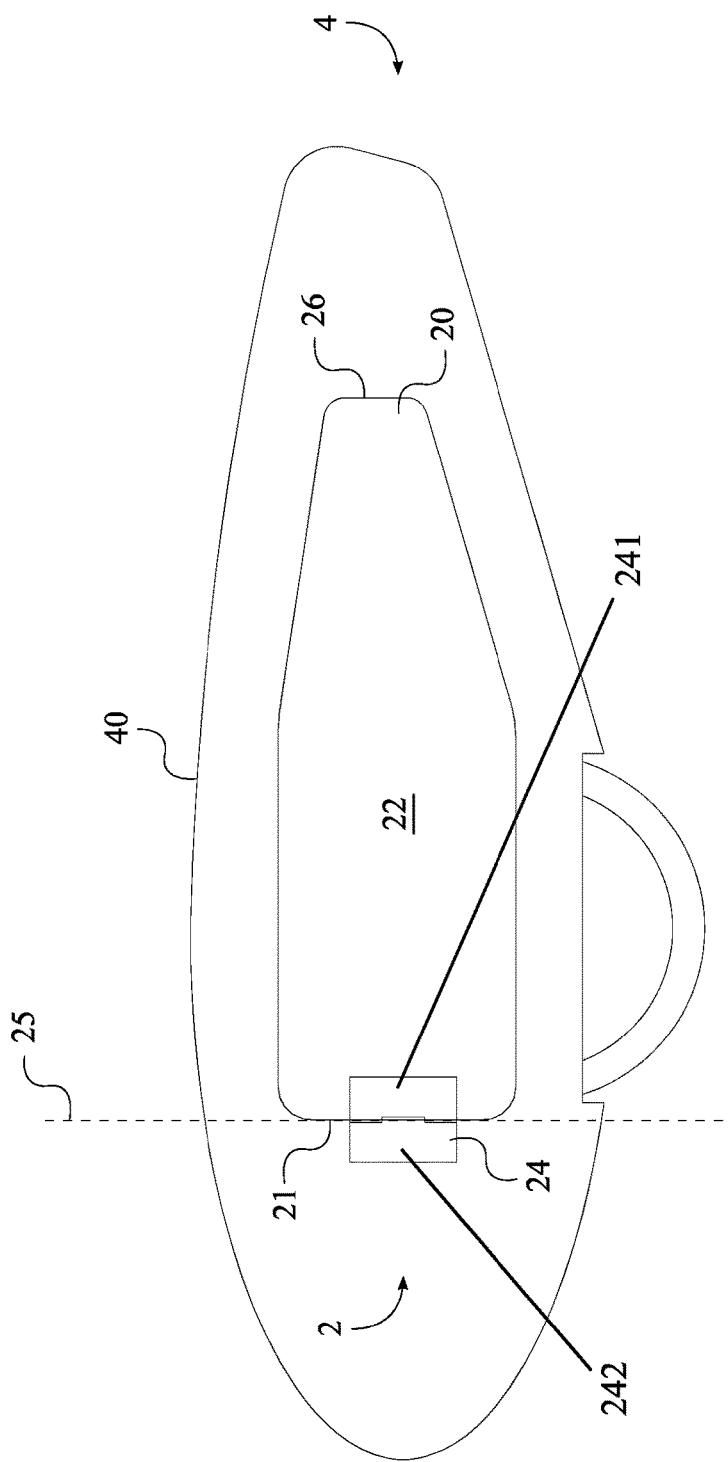
FIG. 5 is a right side elevational view depicting the rotational axis about which the drag pane is pivoted open and closed.

In reference to FIG. 4-5, the fairing hinge 24 is configured to pivotally connect the drag pane 20 with the aircraft wheel fairing 4, wherein a first plate 241 of the fairing hinge 24 is connected to the drag pane 20 and a second plate 242 of the fairing hinge 24 is connected to the aircraft wheel fairing 4. In the preferred embodiment of the present invention, the fairing hinge 24 is positioned adjacent to the leading edge 21 of the drag pane 20, such that the trailing edge 26 pivots away from the aircraft wheel fairing 4. The extent to which the fairing hinge 24 is inset from the leading edge 21 on the drag pane 20 depends on the required force loads and operating capabilities of the drag pane 20. The fairing hinge 24 can also be positioned directly on the leading edge 21 in some embodiments. In yet other embodiments, the fairing hinge 24 is positioned adjacent to the trailing edge 26.

The rod mount 23 is pivotally connected to the head 13, such that the drag pane 20 is able to pivot in relation to the aircraft wheel fairing 4 as the push rod 11 is linearly displaced by the driver 10. To allow the drag pane 20 to pivot without excessive force being applied by the push rod 11, the rod mount 23 is operably disposed from the fairing hinge 24. By increasing the distance between the rod mount 23 and the fairing hinge 24, less force can be applied by the linear actuator 1 while maintaining the same torque applied to rotating the drag pane 20 about the fairing hinge 24.

When the push rod 11 is engaged by the driver 10, the drag pane 20 is pivoted about a rotational axis 25 of the fairing hinge 24; the rotational axis 25 traversing in between the first plate 241 and the second plate 242 as depicted in FIG. 1 and FIG. 5. In the preferred embodiment of the present invention, the rotational axis 25 is substantially perpendicular to the wing of the aircraft, such that the drag pane 20 generates the most drag when deployed into one of the plurality of extended positions. Again, the rod mount 23 is operably disposed from the fairing hinge 24 to allow the drag pane 20 to pivot about the rotational axis 25 while minimizing the required operating force of the linear actuator 1.

The drag pane 20 is selectively angled in relation to the aircraft wheel fairing 4 when the push rod 11 is engaged by the driver 10, such that the desired amount of drag is generated. In the preferred embodiment of the present invention, the driver 10 is a servo motor that allows for the precise linear positioning of the push rod 11, and in turn the selected angle of the drag pane 20. The desired angle of the drag pane 20 is selected using controls in the cockpit of the aircraft, wherein the driver 10 is instructed to position the push rod 11 into the linear position corresponding to the desired angle of the drag pane 20. The linear position of the push rod 11 and the angle of the drag pane 20 in relation to the aircraft wheel fairing 4 can be adjusted in flight as needed, using the controls within the cockpit.

The drag pane 20 is positioned between the retracted position and the plurality of extended positions at a pre-determined rate that is regulated by the driver 10. The pre-determined rate may be a single fixed speed or one of a plurality of selectable speeds. When the plurality of selectable speeds is employed, an additional speed control is integrated into the cockpit, allowing the pilot to choose the pre-determined rate from the plurality of selectable speeds. This can be used to simulate the retraction and extension speeds of retractable landing gear from different types of aircraft. Furthermore, the pre-determined rate can be adjusted, such that the rate at which the drag pane 20 is extended is different than the rate at which the drag pane 20 is retracted.

In reference to FIG. 2, the driver 10 is adjacently connected to the mounting plate 3, wherein the mounting plate 3 provides the connection point between the driver 10 and the landing gear assembly within the aircraft wheel fairing 4. The mounting plate 3 is configured to be positioned within the aircraft wheel fairing 4 in order to operably position the linear actuator 1, such that the linear actuator 1 may adjust the drag pane 20 between the retracted position and each of the plurality of extended positions. The mounting plate 3 can be attached to any structure from the landing gear assembly or the mounting plate 3 can be an integral, structural component of the landing gear assembly, depending on the requirements and the design of the aircraft.

In the preferred embodiment of the present invention, the mounting plate 3 is configured to be positioned within the aircraft wheel fairing 4 such that the push rod 11 is aligned substantially perpendicular to the drag pane 20 in the retracted position. As such, the push rod 11 extends outwards, perpendicular to the side of the wheel of the aircraft. In an alternative embodiment of the present invention, the push rod 11 is oriented substantially parallel to the drag pane 20 in the retracted position. Furthermore, the rod mount 23 is an L-shaped member, such that a portion of the rod mount 23 that is pivotally connected to the head 13 of the push rod 11 is positioned substantially perpendicular to the drag pane 20. The rod mount 23 is positioned adjacent to the fairing hinge 24, such that the linear motion of the push rod 11 is translated to the pivotal movement of the drag pane 20.

Figure 6:
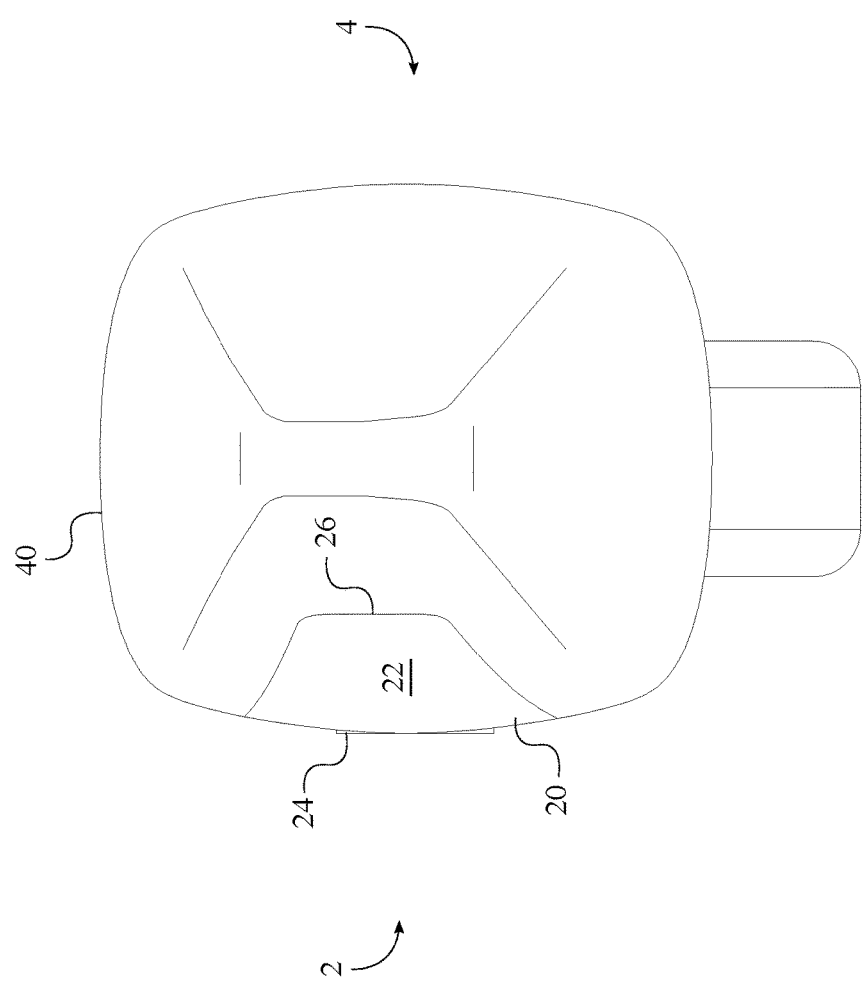
FIG. 6 is a rear elevational view depicting the aerodynamically contoured exterior of the drag pane corresponding to the aerodynamic profile of the aircraft wheel housing, when the drag pane is in the retracted position.

In reference to FIG. 4-6, the drag pane 20 has an aerodynamically contoured exterior 22 opposite the rod mount 23. More specifically, the aerodynamically contoured exterior 22 is the side of the drag pane 20 that is visible when the drag pane 20 is in the retracted position. The aerodynamically contoured exterior 22 corresponds to an aerodynamic profile 40 of the aircraft wheel fairing 4, such that the aircraft wheel fairing 4 remains streamlined and aerodynamic when the drag pane 20 is in the retracted position. In some embodiments, the drag pane 20 may be cut from the aircraft wheel fairing 4, such that the aerodynamically contoured exterior 22 is guaranteed to match the aerodynamic profile 40 of the aircraft wheel fairing 4.

While the aircraft wheel fairing 4 is designed to streamline and reduce the drag of the landing gear assembly, the present invention allows the aircraft wheel fairing 4 to selectively increase the drag. Instances for increasing the drag of the aircraft include: flight instruction requirements;

increasing the drag of the aircraft without increasing the airspeed, such as increasing the rate of descent or landing on runways of limited length; and performing complex aircraft training by simulating the drag forces associated with retractable landing gear without the inherent danger and accompanying insurance costs associated with a retractable landing gear system.

Although the invention has been explained in relation to its preferred embodiment, it is to be understood that many other possible modifications and variations can be made without departing from the spirit and scope of the invention as hereinafter claimed.

What is claimed is:

1. An aircraft drag device comprising:
a driver;
a shaft;
a head;
a drag pane;
a rod mount;
a fairing hinge;
an aircraft wheel fairing;
the driver being positioned within the aircraft wheel fairing;
the shaft being extendably and retractably engaged with the driver;
the head being terminally connected to the shaft;
the shaft being located in between the head and the driver;
the drag pane comprising a leading edge, a trailing edge, an exterior surface, an interior surface, a pane length and a pane thickness;
the leading edge and the trailing edge being oppositely located to each other along the pane length;
the exterior surface and the interior surface being oppositely located to each other along the pane thickness;
the interior surface being oriented towards the driver;
the exterior surface being oriented away from the driver;
the rod mount being disposed on the interior surface;
the rod mount being adjacently located to the trailing edge;
the rod mount being pivotally connected to the head;
the fairing hinge being connected to the drag pane and the aircraft wheel fairing;
the drag pane being pivotally connected to the aircraft wheel fairing about a rotational axis via the fairing hinge;
the drag pane being capable of pivoting about the rotational axis by the shaft retracting into the driver and extending away from the driver and by the rod mount being pivotally connected to the head and by the fairing hinge being connected to the drag pane and the aircraft wheel fairing;
the fairing hinge comprising a first plate and a second plate;
the first plate being connected to the exterior surface;
the first plate being adjacently located to the leading edge;
the aircraft wheel fairing comprising an external surface, a fore and an aft;
the second plate being connected to the external surface;
the rotational axis traversing in between the first plate and the second plate;
the exterior surface being aerodynamically contoured;
the exterior surface matching an aerodynamic profile of the external surface by the drag pane being formed by being cut from the aircraft wheel fairing;
the leading edge being adjacently located to the fore; and
the trailing edge being adjacently located to the aft.

2. The aircraft drag device as claimed in claim 1 further comprising:
a mounting plate;
the mounting plate being positioned within the aircraft wheel fairing; and
the driver being connected to the mounting plate.

3. The aircraft drag device as claimed in claim 1, wherein the driver is a servo motor.

* * * * *